United States Patent
Kobayashi et al.

(10) Patent No.: US 12,060,521 B2
(45) Date of Patent: Aug. 13, 2024

(54) OIL RECOVERY AGENT, OIL DISPERSION, AND OIL RECOVERY METHOD

(71) Applicant: Mitsubishi Chemical Corporation, Tokyo (JP)

(72) Inventors: Ryohei Kobayashi, Tokyo (JP); Tomoya Fujita, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 56 days.

(21) Appl. No.: 16/810,032

(22) Filed: Mar. 5, 2020

(65) Prior Publication Data

US 2020/0208041 A1 Jul. 2, 2020

Related U.S. Application Data

(63) Continuation of application No. PCT/JP2018/033327, filed on Sep. 7, 2018.

(30) Foreign Application Priority Data

| Sep. 8, 2017 | (JP) | 2017-173426 |
| Sep. 8, 2017 | (JP) | 2017-173427 |
| Sep. 8, 2017 | (JP) | 2017-173428 |
| Sep. 8, 2017 | (JP) | 2017-173429 |

(51) Int. Cl.
   *C09K 8/588* (2006.01)
   *E21B 43/16* (2006.01)
   *E21B 43/34* (2006.01)

(52) U.S. Cl.
   CPC ............. *C09K 8/588* (2013.01); *E21B 43/16* (2013.01); *E21B 43/34* (2013.01)

(58) Field of Classification Search
   CPC ......... C09K 8/588; E21B 43/16; E21B 43/34; C08L 29/04
   See application file for complete search history.

(56) References Cited

U.S. PATENT DOCUMENTS

| 4,218,280 A * | 8/1980 | Philipp | C08J 3/28 522/112 |
| 2017/0037294 A1 | 2/2017 | Mandai et al. | |
| 2018/0243706 A1 | 8/2018 | Kaneshima et al. | |

FOREIGN PATENT DOCUMENTS

| JP | 08-127622 | 5/1996 |
| JP | 2014-141625 | 8/2014 |
| JP | 2015-143356 | 8/2015 |
| WO | 2005/040669 | 5/2005 |
| WO | 2016-163496 | 10/2016 |
| WO | 2017-047616 | 3/2017 |

OTHER PUBLICATIONS

Office Action issued in Japanese Patent Application No. 2018-548234, Apr. 12, 2022, English translation.
ISR issued in WIPO Patent Application No. PCT/JP2018/033327, dated Dec. 4, 2018, English translation.
Written Opinion issued in WIPO Patent Application No. PCT/JP2018/033327, dated Dec. 4, 2018.
Office Action issued in the corresponding Canadian Patent Application No. 3,074,980 dated on Jul. 19, 2023.
Office Action that issued in corresponding Canadian Patent Application No. 3,074,980, dated Mar. 26, 2024.

* cited by examiner

*Primary Examiner* — Aiqun Li
(74) *Attorney, Agent, or Firm* — GREENBLUM & BERNSTEIN, P.L.C.

(57) ABSTRACT

The present invention provides an oil recovery agent which has a property of improving fluidity by reducing viscosity of oil (viscosity reduction properties) and a property of rapidly separating after being dispersed in oil (immediate separability), and which enables to recover oil rapidly. The oil recovery agent of the present invention contains a polyvinyl alcohol resin having a water contact angle of 70° or less when formed into a film.

2 Claims, No Drawings

OIL RECOVERY AGENT, OIL DISPERSION, AND OIL RECOVERY METHOD

CLAIM FOR PRIORITY

This application is a Continuation of PCT/JP2018/033327 filed Sep. 7, 2018, and claims the priority benefit of Japanese applications 2017-173426 filed Sep. 8, 2017, 2017-173427 filed Sep. 8, 2017, 2017-173428 filed Sep. 8, 2017, 2017-173429 filed Sep. 8, 2017, the contents of which are expressly incorporated by reference herein in their entireties.

TECHNICAL FIELD

The present invention relates to an oil recovery agent, an oil dispersion, and an oil recovery method, more particularly to an oil recovery agent to be added to crude oil or excavation water during mining for lowering viscosity of crude oil to facilitate recovery of the crude oil, an oil dispersion containing the oil recovery agent, and an oil recovery method for recovering crude oil by using the oil recovery agent.

BACKGROUND ART

Crude oil, typified by heavy oil, is unconventional petroleum having higher viscosity than conventional petroleum and is expected to contribute to relaxation of a petroleum depletion problem because of its abundant reserves.

Crude oil present in a subterranean reservoir is generally recovered by drilling an excavation hole to a subterranean formation while circulating an excavation fluid (specifically, excavation water) in the excavation hole.

However, since the crude oil has high viscosity and lacks in fluidity, there is a problem that efficient recovery from the reservoir and pipeline transport are difficult.

As a method of improving the fluidity of such high viscosity crude oil, and recovering and transporting the crude oil, for example, a technique using polyvinyl alcohol as a dispersant or an emulsifier is disclosed (for example, see Patent Literatures 1 and 2).

Patent Literature 1 proposes that high viscosity crude oil is emulsified using a crude oil dispersion stabilizer containing a vinyl alcohol polymer having a hydrophobic group at its terminal or side chain. Patent Literature 2 proposes that a crude oil dispersion stabilizer containing a vinyl alcohol polymer having a degree of saponification of more than 70 mol % and equal to or less than 82 mol % and a total content of a carboxyl group and a lactone ring is 0.02 mol % to 1 mol % with respect to all constituent units of the vinyl alcohol polymer.

Such a crude oil dispersion stabilizer is added directly or as an aqueous solution by being mixed with excavation water to crude oil during excavation.

CITATION LIST

Patent Literature

Patent Literature 1: WO 2016/163496
Patent Literature 2: WO 2017/047616

SUMMARY OF INVENTION

Technical Problem

As described above, since the crude oil mined from the subterranean reservoir contains excavation water containing a dispersion stabilizer, the excavation water is separated to recover only the crude oil, and the separated excavation water is reused in excavation.

In view of work efficiency, it is desirable to rapidly separate the excavation water from the mined crude oil, but in the techniques of Patent Literatures 1 and 2, the viscosity is reduced by dispersing or emulsifying the high viscosity crude oil, and the obtained crude oil dispersion or emulsion is present stably for a long time, and immediate separability that the crude oil is rapidly separated from the crude oil dispersion or emulsion is not considered at all.

The present invention has been made to solve the above problem, and an object thereof is to provide an oil recovery agent excellent in immediate separability which imparts viscosity reduction properties that viscosity of crude oil is decreased to improve fluidity when the crude oil is mined, and can be rapidly separated from the crude oil after the crude oil is mined, an oil dispersion containing the oil recovery agent, and an oil recovery method for recovering crude oil using the oil recovery agent.

Solution to Problem

As a result of repeating intensive studies, the present inventors have found that the above problem can be solved by using a specific polyvinyl alcohol (hereinafter may be referred to as "PVA") resin to complete the present invention.

That is, the present invention relates to the following <1> to <12>.

<1> An oil recovery agent comprising: a polyvinyl alcohol resin having a water contact angle of 70° or less when formed into a film.

<2> The oil recovery agent according to item <1>, wherein the polyvinyl alcohol resin is a polyvinyl alcohol resin having a hydrophilic modified group.

<3> The oil recovery agent according to item <1> or <2>, wherein the polyvinyl alcohol resin is a polyvinyl alcohol resin having a primary hydroxyl group in its side chain.

<4> The oil recovery agent according to item <1> or <2>, wherein the polyvinyl alcohol resin is a polyvinyl alcohol resin having a group of a sulfonic acid or a salt thereof.

<5> The oil recovery agent according to item <1> or <2>, wherein the polyvinyl alcohol resin is a polyvinyl alcohol resin having an oxyalkylene group.

<6> The oil recovery agent according to item <1>, wherein a degree of saponification of the polyvinyl alcohol resin is 90 mol % to 100 mol %.

<7> The oil recovery agent according to any one of items <1> to <6>, wherein an average degree of polymerization of the polyvinyl alcohol resin is 100 to 4000.

<8> The oil recovery agent according to any one of items <1> to <7>, which is an aqueous solution.

<9> The oil recovery agent according to item <8>, wherein a content of the polyvinyl alcohol resin is 0.1 to 20 parts by mass with respect to 100 parts by mass of water.

<10> The oil recovery agent according to any one of items <1> to <9>, which is used for crude oil having an API degree of less than 39°.

<11> An oil dispersion comprising:
the oil recovery agent according to any one of items <1> to <10> and crude oil, wherein a content of the oil recovery agent is 0.5 to 200 parts by mass with respect to 100 parts by mass of the crude oil.

<12> An oil recovery method for recovering crude oil contained in a stratum, comprising: a pumping-up step of pumping up crude oil whose viscosity is reduced by adding the oil recovery agent according to any one of items <1> to <10> to the crude oil; and a separation step of separating the oil recovery agent from the pumped crude oil.

Advantageous Effects of Invention

According to the present invention, since the viscosity of the crude oil can be reduced and the fluidity of the crude oil dispersion can be improved when the crude oil is mined, the crude oil (specifically, oil dispersion) can be smoothly pumped up, and the oil recovery agent can be rapidly separated from the crude oil (oil dispersion) pumped up after the crude oil is mined, so that work efficiency of the crude oil recovery can be improved.

DESCRIPTION OF EMBODIMENTS

Hereinafter, the present invention will be described in more detail.

In the present description, (meth)allyl means allyl or methallyl, (meth)acryl means acryl or methacryl, and (meth)acrylate means acrylate or methacrylate, respectively.

Further, in the present description, "mass" has the same meaning as "weight".

An oil recovery agent of the present invention contains a PVA resin having a water contact angle of 70° or less when formed into a film.

[PVA Resin Having Water Contact Angle of 70° or Less when Formed Into Film]

When the PVA resin used in the present invention is formed into a film, the water contact angle of the film surface is 70° or less, preferably 68° or less, and more preferably 67° or less. A lower limit value thereof is preferably 30°. When the water contact angle is too large, the effects of the present invention cannot be obtained. When the water contact angle is too small, dispersibility to oil tends to decrease.

Since the PVA resin having a water contact angle of 70° or less when formed into a film has high hydrophilicity, the PVA resin is difficult to be adsorbed onto oil particles. Therefore, even if the crude oil is in a dispersed state when the PVA resin is added to the crude oil and stirred, the PVA resin has high separability, so that it is presumed that immediate separability is expressed by leaving the oil dispersion to stand.

A method of measuring the water contact angle of the PVA resin of the present invention when formed into a film is as follows.
(1) 10% by mass of an aqueous solution of the PVA resin (hereinafter also referred to as a "PVA resin aqueous solution") is prepared.
(2) 13 g of the PVA resin aqueous solution prepared in (1) is poured into a frame of longitudinal×transversal=10 cm×10 cm and left to stand for 3 days under an environment of 23° C. and 50% RH to prepare a cast film having a thickness of 100 μm.
(3) Immediately after the cast film prepared in (2) is placed horizontally and 0.2 μl of purified water drips to form a water drop under conditions of 23° C. and 50% RH, a contact angle between the water drop and a surface of the cast film surface is measured with a contact angle meter (for example, DropMaster 500: manufactured by KYOWA INTERFACE SCIENCE). The contact angle is measured ten times, and an average value thereof is set as the water contact angle of the present invention.

The PVA resin of the present embodiment is obtained by polymerizing a vinyl ester monomer and saponifying the obtained polyvinyl ester.

Examples of the vinyl ester monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, and vinyl versatate, and vinyl acetate is preferably used economically.

In addition to the vinyl ester monomer, an α-olefin such as ethylene and propylene; derivatives such as hydroxy group-containing α-olefins such as 3-butene-1-ol, 4-pentene-1-ol, and 5-hexene-1,2-diol and acylated products thereof; unsaturated acids such as itaconic acid, maleic acid, and acrylic acid, or salts and mono- or di-alkyl esters thereof; nitriles such as acrylonitrile; amides such as methacrylamide and diacetone acrylamide; compounds such as olefin sulfonic acids such as ethylene sulfonic acid, allyl sulfonic acid, methallyl sulfonic acid, and AMPS and salts thereof; and the like may be copolymerized as copolymerization components as long as physical properties of the resin are not significantly affected.

To set the water contact angle of the PVA resin of the present embodiment when formed into a film as 70° or less, examples of a method include a method of adjusting a degree of saponification of the PVA resin and a method of containing a modified group in the PVA resin.

The PVA resin of the present embodiment may be an unmodified PVA resin or a modified PVA resin, but is more preferably a modified PVA resin. Examples of the modified PVA resin include a copolymerized modified PVA resin that copolymerizes a vinyl ester monomer with a copolymerizable monomer and is saponified and a post-modified PVA resin produced by post modification of unmodified PVA.

Examples of the other unsaturated monomers copolymerizable with the above vinyl ester monomer include olefins such as ethylene, propylene, isobutylene, α-octene, α-dodecene, and α-octadecene; unsaturated acids such as acrylic acid, methacrylic acid, crotonic acid, maleic acid, maleic anhydride, itaconic acid, and undecylenic acid, or salts and mono- or di-alkyl esters thereof; nitriles such as acrylonitrile and methacrylonitrile; amides such as diacetone acrylamide, acrylamide, and methacrylamide; olefin sulfonic acids such as ethylene sulfonic acid, allyl sulfonic acid, and methallyl sulfonic acid or salts thereof; alkyl vinyl ethers; N-acrylamide methyl trimethyl ammonium chloride; allyl trimethyl ammonium chloride; dimethyl allyl vinyl ketone; N-vinyl pyrrolidone; vinyl chloride; vinylidene chloride; polyoxyalkylene (meth)allyl ethers such as polyoxyethylene (meth)allyl ether and polyoxypropylene (meth)allyl ether; polyoxyalkylene (meth)acrylates such as polyoxyethylene (meth)acrylate and polyoxypropylene (meth)acrylate; polyoxyalkylene (meth)acrylamides such as polyoxyethylene (meth)acrylamide and polyoxypropylene (meth)acrylamide; polyoxyethylene (1-(meth)acrylamide-1,1-dimethylpropyl) ester; polyoxyalkylene vinyl ethers such as polyoxyethylene vinyl ether and polyoxypropylene vinyl ether; polyoxyalkylene allylamines such as polyoxyethylene allylamine and polyoxypropylene allylamine; polyoxyalkylene vinylamines such as polyoxyethylene vinylamine and polyoxypropylene vinylamine; hydroxy group-containing α-olefins such as 3-butene-1-ol, 4-pentene-1-ol, and 5-hexene-1-ol, or acylated products thereof; vinyl compounds such as vinyl ethylene carbonate, 2,2-dialkyl-4-vinyl-1,3-dioxolane, glycerin monoallyl ether, and 3,4-diacetoxy-1-butene; isopropenyl acetate; substituted vinyl acetates such as 1-methoxy vinyl acetate; 1,4-diacetoxy-2-butene; and vinylene carbonate.

Examples of the copolymerized modified PVA include a PVA resin having a primary hydroxyl group in the side chain. Examples of the PVA resin include: a PVA resin having a 1,2-diol bond in the side chain, obtained by copolymerization of 3,4-diacetoxy-1-butene, vinyl ethylene carbonate, and glycerin monoallyl ether; and a PVA resin having a hydroxymethyl group in the side chain, obtained by copolymerization of hydroxymethylvinylidene diacetates such as 1,3-diacetoxy-2-methylenepropane, 1,3-dipropionyloxy-2-methylenepropane, and 1,3-dibutyronyloxy-2-methylenepropane.

Examples of a method of producing the post-modified PVA resin include acetoacetate esterification, acetalization, urethanization, etherification, and phosphate esterification of the unmodified PVA. In the present embodiment, the modified PVA resin is preferably a PVA resin having a hydrophilic modified group such as a PVA resin having a primary hydroxyl group in the side chain, a PVA resin having a group of a sulfonic acid or a salt thereof, and a PVA resin having an oxyalkylene group. The modified PVA resin will be described later.

The degree of saponification (measured in accordance with JIS K 6726) of the PVA resin used in the present embodiment is preferably 90 mol % to 100 mol %, more preferably 95 mol % to 100 mol %, and still more preferably 98 mol % to 100 mol % in the unmodified PVA.

In the modified PVA resin, the degree of saponification is preferably 70 mol % to 100 mol %, more preferably 80 mol % to 100 mol %, still more preferably 90 mol % to 100 mol %, and particularly preferably 95 mol % to 100 mol % depending on modified species.

When the degree of saponification is too low, hydrophilicity decreases, so that the immediate separability from the crude oil tends to be low.

An average degree of polymerization (measured in accordance with JIS K 6726) of the PVA resin used in the present embodiment is preferably 100 to 4000, more preferably 150 to 2500, and still more preferably 200 to 1000.

In the modified PVA resin, the average degree of polymerization is also preferably in a range of 100 to 4000 although depending on the modified species.

A viscosity reduction effect of oil tends to be low when the average degree of polymerization is too small or too large.

The PVA resin used in the present embodiment having a water contact angle of the film surface of 70° or less when formed into a film may be one type or used in a mixture of two or more types, and when used in the mixture, the average degree of polymerization and an average value of the degree of saponification are preferably in the ranges described above.

Next, the modified PVA resin will be described.

In the present embodiment, a preferable modified PVA resin includes a PVA resin having a hydrophilic modified group, and examples thereof include a polyvinyl alcohol (PVA) resin having a primary hydroxyl group in the side chain, a polyvinyl alcohol (PVA) resin having a group of a sulfonic acid or a salt thereof, and a polyvinyl alcohol (PVA) resin having an oxyalkylene group.

[PVA Resin Having Primary Hydroxyl Group in Side Chain]

The number of the primary hydroxyl groups of the PVA resin having a primary hydroxyl group in the side chain used in the present embodiment is generally 1 to 5, preferably 1 to 2, and particularly preferably 1. In addition to the primary hydroxyl group, a secondary hydroxyl group is preferably included.

It is presumed that by having a primary hydroxyl group in the side chain, the PVA resin has high hydrophilicity, prevents from being adsorbed to the oil particles, and expresses high immediate separability after being dispersed in the oil.

Further, by having a primary hydroxyl group in the side chain, it is considered that high viscosity reduction properties are exhibited by moderately disturbing crystallinity of the oil.

Examples of the PVA resin having a primary hydroxyl group in the side chain include a PVA resin having a 1,2-diol structure in the side chain and a PVA resin having a hydroxy alkyl group in the side chain. Among these, the PVA resin having a 1,2-diol structure in the side chain is preferable since the effects of the present invention are easily obtained.

The degree of saponification of the PVA resin having a primary hydroxyl group in the side chain (measured in accordance with JIS K 6726) is generally 70 mol % to 100 mol %, preferably 80 mol % to 100 mol %, more preferably 90 mol % to 100 mol %, and still more preferably 95 mol % to 100 mol %. When the degree of saponification is too low, hydrophilicity decreases, so that the immediate separability from the crude oil tends to be low.

A content of a structural unit having a primary hydroxyl group in the side chain contained in the PVA resin having a primary hydroxyl group in the side chain is generally 0.1 mol % to 20 mol %, preferably 2 mol % to 10 mol %. When the content is too low, separation tends to be slow. On the contrary, when the content is too high, there is a problem that production cost increases.

An average degree of polymerization (measured in accordance with JIS K 6726) of the PVA resin having a primary hydroxyl group in the side chain is preferably 100 to 4000, more preferably 150 to 2500, and still more preferably 200 to 1000. A viscosity reduction effect of oil tends to be low when the average degree of polymerization is too small or too large.

(PVA Resin Having 1,2-diol Structure in Side Chain)

The PVA resin having a primary hydroxyl group in the side chain is more preferably a PVA resin having 1,2-diol structure in the side chain (hereinafter may be referred to as a "side chain 1,2-diol-containing PVA resin") in view of viscosity reduction properties and immediate separability.

In particular, the side chain 1,2-diol containing PVA resin used in the present embodiment preferably has a structural unit represented by the following general formula (1).

[Chem. 1]

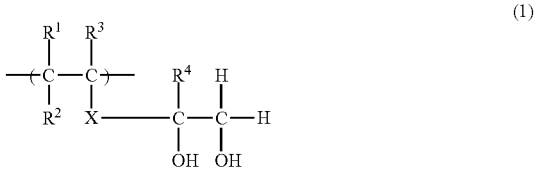

(1)

(In the formula (1), $R^1$, $R^2$, $R^3$, and $R^4$ independently represents a hydrogen atom or an organic group, and X represents a single bond or a bond chain.)

Such $R^1$ to $R^4$ in the structural unit represented by the general formula (1) are all preferably hydrogen atoms, and may be an organic group as long as the amount does not significantly impair resin properties. Examples of the organic group include an alkyl group having 1 to 4 carbon atoms such as a methyl group, an ethyl group, an n-propyl group, an isopropyl group, an n-butyl group, an isobutyl group, and a tert-butyl group, the organic group may be optionally substituted, and a functional group such as a halogen group, a hydroxyl group, an ester group, a carboxylic acid group, and a sulfonic acid group, and the organic group may include functional groups such as a halogen group, a hydroxyl group, an ester group, a carboxylic acid group, and a sulfonic acid group as necessary.

X in the structural unit represented by the general formula (1) is preferably a single bond in view of thermal stability and stability under high temperature and acidic conditions, but may be a bond chain as long as the effects of the present invention are not impaired. Examples of the bond chain include hydrocarbon groups such as a linear or branched alkylene having 1 to 4 carbon atoms, a linear or branched alkenylene having 1 to 4 carbon atoms, a linear or branched alkynylene having 1 to 4 carbon atoms, a phenylene group, and a naphthylene group (these hydrocarbon groups may be substituted with halogen atoms such as a fluorine atom, a chlorine atom, and a bromine atom), and —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi (OR)$_2$—, —OSi(OR)$_2$ O—, —Ti(OR)$_2$—, —OTi(OR)$_2$—, —OTi(OR)$_2$O—, —Al(OR)—, —OAl(OR)—, —OAl(OR)O— (each R is independently any substituent, preferably an alkyl group having 1 to 12 carbon atoms, and m is a natural number). Among these bond chains, an alkylene group having 6 or less carbon atoms, particularly a methylene group or —CH$_2$OCH$_2$— is preferable in view of stability during production or use.

In particular, R$^1$ to R$^4$ in the structural unit represented by the general formula (1) are all hydrogen atoms, X is preferably a single bond, and a PVA resin having a structural unit represented by the following formula (1') is suitably used.

[Chem. 2]

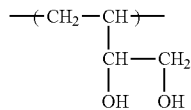

(1')

As a method of producing the side chain 1,2-diol-containing PVA resin used in the present embodiment, for example, preferably used are (i) a method of saponifying a copolymer of a vinyl ester monomer and a compound represented by the following general formula (2); (ii) a method of saponifying and decarbonating a copolymer of a vinyl ester monomer and a compound represented by the following general formula (3); and (iii) a method of saponifying and deketalizing a copolymer of a vinyl ester monomer and a compound represented by the following general formula (4).

[Chem. 3]

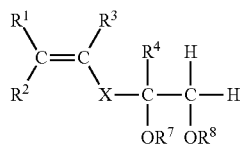

(2)

(In the formula (2), any of R$^1$, R$^2$, R$^3$, R$^4$, and X is the same as the case of the general formula (1). R$^7$ and R$^8$ each independently represent a hydrogen atom or R$^9$—CO— (in the formula, R$^9$ represents an alkyl group having 1 to 4 carbon atoms).)

[Chem. 4]

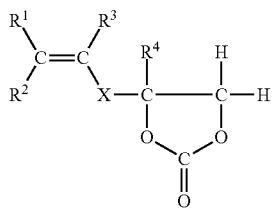

(3)

(In the formula (3), any of R$^1$, R$^2$, R$^3$, R$^4$, and X is the same as the case of the general formula (1).)

[Chem. 5]

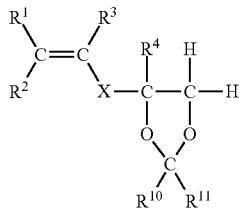

(4)

(In the formula (4), any of R$^1$, R$^2$, R$^3$, R$^4$, and X is the same as the case of the general formula (1). R$^{10}$ and R$^{11}$ each independently represent a hydrogen atom or an alkyl group having 1 to 4 carbon atoms.)

As the above methods (i), (ii), and (iii), for example, a method described in JP-A-2006-95825 can be used.

In particular, in the method (i), 3,4-diacyloxy-1-butene is preferably used, particularly 3,4-diacetoxy-1-butene is preferably used as the compound represented by the general formula (2) since copolymerization reactivity and industrial handleability are excellent.

Examples of the vinyl ester monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, and vinyl versatate, and vinyl acetate is preferably used economically.

Vinyl acetate is used as the vinyl ester monomer, and reactivity ratios (r) of monomers when vinyl acetate and 3,4-diacetoxy-1-butene are copolymerized are r (vinyl acetate)=0.710, and r (3,4-diacetoxy-1-butene)=0.701. This indicates that compared with r (vinyl acetate)=0.85 and r (vinyl ethylene carbonate)=5.4 in a case of vinyl ethylene carbonate which is an example of the compound represented by the general formula (3) used in the method (ii), 3,4-diacetoxy-1-butene is excellent in copolymerization reactivity with vinyl acetate.

A chain transfer constant (Cx) of 3,4-diacetoxy-1-butene is Cx (3,4-diacetoxy-1-butene)=0.003 (65° C.). This indicates that the degree of polymerization is easy to increase, and it is difficult to cause decrease in a polymerization rate compared with Cx (vinyl ethylene carbonate) of vinyl ethylene carbonate=0.005 (65° C.) and Cx (2,2-dimethyl-4-vinyl-1,3-dioxolane) of 2,2-dimethyl-4-vinyl-1,3-dioxolane which is an example of the compound represented by the general formula (4) used in the method (iii)=0.023(65° C.).

In such 3,4-diacetoxy-1-butene, a byproduct generated when saponifying the copolymer is the same as a compound which is a byproduct during saponification from a structural unit derived from vinyl acetate frequently used as a vinyl ester monomer, and it is not necessary to resolutely provide a special device or process to a post treatment or solvent recovery system, and it is also an industrially great advantage that equipment in the related art can be used.

The above 3,4-diacetoxy-1-butene can be produced by a synthesis method via an epoxy butene derivative described in WO 2000/24702, Description of U.S. Pat. No. 5,623,086, Description of U.S. Pat. No. 6,072,079, and the like, and a reaction of isomerizing 1,4-diacetoxy-1-butene which is an intermediate product of a 1,4-butanediol production process by using a metal catalyst such as palladium chloride.

When decarbonation or deacetalization of the PVA resin obtained by the method (ii) or (iii) is insufficient, a carbonate ring or an acetal ring may remain in the side chain, the PVA resin may be crosslinked by the cyclic group in a heating and drying step during production, and a gel or the like may be generated.

Therefore, in view of this, the PVA resin obtained by the method (i) is suitably used in the present embodiment.

In the present embodiment, in addition to the monomer (vinyl ester monomer, the compounds represented by the general formulae (2), (3), and (4)), an α-olefin such as ethylene and propylene; derivatives such as hydroxy group-containing α-olefins such as 3-butene-1-ol, 4-pentene-1-ol, and 5-hexene-1,2-diol and acylated products thereof; unsaturated acids such as itaconic acid, maleic acid, and acrylic acid, or salts and mono- or di-alkyl esters thereof; nitriles such as acrylonitrile; amides such as methacrylamide and diacetone acrylamide; compounds such as olefin sulfonic acids such as ethylene sulfonic acid, allyl sulfonic acid, methallyl sulfonic acid, and AMPS and salts thereof; and the like may be copolymerized as copolymerization components as long as physical properties of the resin are not significantly affected.

The degree of saponification of the side chain 1,2-diol-containing PVA resin (measured in accordance with JIS K 6726) is generally 70 mol % to 100 mol %, preferably 80 mol % to 100 mol %, more preferably 90 mol % to 100 mol %, and still more preferably 95 mol % to 100 mol %. When the degree of saponification is too low, hydrophilicity decreases, so that the immediate separability from the crude oil tends to be low.

The content of the structural unit represented by the general formula (1) contained in the side chain 1,2-diol-containing PVA resin is generally from 0.1 mol % to 20 mol %, preferably 2 mol % to 10 mol %, and more preferably 2 mol % to 8 mol %. When the content is too low, separation tends to be slow. On the contrary, when the content is too high, there is a problem that production cost increases.

The content of the structural unit represented by the general formula (1) in the side chain 1,2-diol-containing PVA resin can be determined from a $^1$H-NMR spectrum (solvent: DMSO-d6, internal standard: tetramethylsilane) although the PVA resin is completely saponified. Specifically, the content can be calculated from a peak area derived from a hydroxyl proton, a methine proton, and a methylene proton in the modifying group in the structural unit represented by the general formula (1), a methylene proton in the main chain, a hydroxyl proton linked to the main chain, and the like.

The average degree of polymerization (measured in accordance with JIS K 6726) of the side chain 1,2-diol-containing PVA resin is preferably 100 to 4000, more preferably 150 to 2500, and still more preferably 200 to 1000. A viscosity reduction effect of oil tends to be low when the average degree of polymerization is too small or too large.

The PVA resin having a primary hydroxyl group in the side chain used in the present embodiment may be one type or used in a mixture of two or more types, and when used in the mixture, the average degree of polymerization and an average value of the degree of saponification are preferably in the ranges described above.

[PVA Resin Containing Group of Sulfonic Acid or Salt Thereof]

A polyvinyl alcohol resin having a group of a sulfonic acid or a salt thereof (hereinafter may be referred to as a "PVA resin containing a group of a sulfonic acid or a salt thereof") used in the present embodiment has a group of a sulfonic acid or a salt thereof represented by the following general formula (5) directly in or via a bond chain to the main chain of PVA.

[Chem. 6]

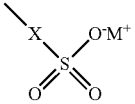

(5)

(In the formula (5), x represents a single bond or a bond chain, and M represents a hydrogen atom, an alkali metal, or an ammonium group.)

It is presumed that by having a group of a sulfonic acid or a salt thereof, such a PVA resin containing a group of a sulfonic acid or a salt thereof has high hydrophilicity, prevents adsorption of the PVA resin containing a group of a sulfonic acid or a salt thereof to oil particles, and expresses excellent immediate separability. In addition, it is presumed that crystallinity is moderately disturbed and excellent viscosity reduction properties are exhibited since the PVA resin has a group of a sulfonic acid or a salt thereof.

In the above general formula (5), X represents a single bond or a bond chain. The bond chain is not particularly limited as long as it is a divalent linking group, and examples thereof include hydrocarbon groups such as a linear or branched alkylene having 1 to 20 carbon atoms, a linear or branched alkenylene having 1 to 20 carbon atoms, a linear or branched alkynylene having 1 to 20 carbon atoms, a phenylene group, and a naphthylene group (these hydrocarbon groups may be substituted with halogen atoms such as a fluorine atom, a chlorine atom, and a bromine atom), and —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$) CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi (OR)$_2$—, —OSi(OR)$_2$O—, —Ti(OR)$_2$—, —OTi(OR)$_2$—, —OTi (OR)$_2$O—, —Al(OR)—, —OAl(OR)—, —OAl(OR)O— (each R is independently any substituent, preferably an alkyl group having 1 to 15 carbon atoms, and m is an integer of 1 to 5). These bond chains may be used alone or in combination of two or more kinds thereof. X is preferably a single bond or an alkylene group having 1 to 6 carbon atoms in view of stability during production or use.

M represents a hydrogen atom, an alkali metal, or an ammonium group. Examples of the alkali metal include lithium, sodium, potassium, rubidium, and cesium. M is preferably sodium in view of easy obtainment.

Examples of the method of producing the PVA resin containing a group of a sulfonic acid or a salt thereof used in the present embodiment include (i) a method of copolymerizing and saponifying a vinyl ester monomer and an unsaturated monomer containing a group of a sulfonic acid or a salt thereof and saponifying the copolymer, (ii) a method of polymerizing and saponifying a vinyl ester monomer in the co-presence of, as a chain transfer agent, alcohol having a group of a sulfonic acid or a salt thereof and a compound containing a functional group such as aldehyde or thiol (iii) a method of heating the PVA resin in an acidic sodium sulfite aqueous solution after treating the PVA resin with bromine, iodine, or the like, (iv) a method of heating the PVA resin in a concentrated sulfuric acid aqueous solution, and (v) a method of acetalizing the PVA resin with an aldehyde compound having a group of a sulfonic acid or a salt thereof.

Among them, the method (i) of copolymerizing a vinyl ester monomer with an unsaturated monomer containing a group of a sulfonic acid or a salt thereof, and saponifying the obtained polymer is preferable in view of safety and workability during production.

Hereinafter, the method (i) will be mainly described, but the present invention is not limited thereto.

Examples of the vinyl ester monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, and vinyl versatate. Among them, vinyl acetate is preferably used in view of profitability.

Examples of the unsaturated monomer containing a group of a sulfonic acid or a salt thereof include an olefin sulfonic acid or a salt thereof represented by the following general formula (6), a sulfoalkyl malate represented by the following general formula (7) or (8), a sulfoalkyl (meth)acrylamide represented by the following general formula (9), (10), or (11), and a sulfoalkyl (meth)acrylate represented by the following general formula (12).

[Chem. 7]

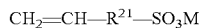

$$CH_2=CH-R^{21}-SO_3M \qquad (6)$$

(In the formula (6), $R^{21}$ represents an alkylene group having 1 to 4 carbon atoms, M represents a hydrogen atom, an alkali metal, or an ammonium group.)

[Chem. 8]

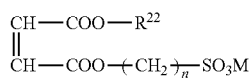

$$\begin{array}{l} CH-COO-R^{22} \\ \parallel \\ CH-COO\!-\!\!\left(CH_2\right)_{\!\!n}\!\!-SO_3M \end{array} \qquad (7)$$

(In the formula (7), $R^{22}$ represents an alkyl group having 1 to 3 carbon atoms, n represents an integer of 2 to 4, and M represents a hydrogen atom, an alkali metal, or an ammonium group.)

[Chem. 9]

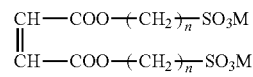

$$\begin{array}{l} CH-COO\!-\!\!\left(CH_2\right)_{\!\!n}\!\!-SO_3M \\ \parallel \\ CH-COO\!-\!\!\left(CH_2\right)_{\!\!n}\!\!-SO_3M \end{array} \qquad (8)$$

(In the formula (8), n represents an integer of 2 to 4, M represents a hydrogen atom, an alkali metal, or an ammonium group.)

[Chem. 10]

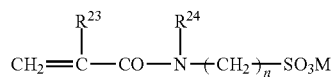

$$CH_2=\underset{\underset{R^{23}}{|}}{C}-CO-\underset{\underset{R^{24}}{|}}{N}-(CH_2)_n-SO_3M \qquad (9)$$

(In the formula (9), $R^{23}$ and $R^{24}$ each independently represent a hydrogen atom or an alkyl group having 1 to 3 carbon atoms, n represents an integer of 2 to 4, and M represents a hydrogen atom, an alkali metal, or an ammonium group.)

[Chem. 11]

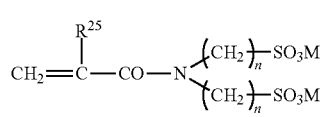

$$CH_2=\underset{\underset{R^{25}}{|}}{C}-CO-N\underset{(CH_2)_n-SO_3M}{\overset{(CH_2)_n-SO_3M}{<}} \qquad (10)$$

(In the formula (10), $R^{25}$ represents a hydrogen atom or an alkyl group having 1 to 3 carbon atoms, n represents an integer of 2 to 4, M represents a hydrogen atom, an alkali metal, or an ammonium group.)

[Chem. 12]

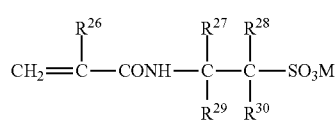

$$CH_2=\underset{\underset{R^{26}}{|}}{C}-CONH-\underset{\underset{R^{29}}{|}}{\overset{R^{27}}{\underset{|}{C}}}-\underset{\underset{R^{30}}{|}}{\overset{R^{28}}{\underset{|}{C}}}-SO_3M \qquad (11)$$

(In the formula (11), $R^{26}$ represents an alkyl group having 1 to 3 carbon atoms or an alkyl group having 1 to 3 carbon atoms, $R^{27}$, $R^{28}$, $R^{29}$, and $R^{30}$ each represent a hydrogen atom, and M represents a hydrogen atom, an alkali metal, or an ammonium group.)

[Chem. 13]

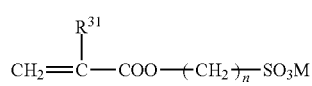

$$CH_2=\underset{\underset{R^{31}}{|}}{C}-COO-(CH_2)_n-SO_3M \qquad (12)$$

(In the formula (12), $R^{31}$ represents a hydrogen atom or an alkyl group having 1 to 3 carbon atoms, n represents an integer of 2 to 4, M represents a hydrogen atom, an alkali metal, or an ammonium group.)

Specific examples of the olefin sulfonic acid or a salt thereof include olefin sulfonic acids such as a vinyl sulfonic acid, an allyl sulfonic acid, and a methallyl sulfonic acid, or salts thereof.

Specific examples of the sulfoalkyl malate include sodium sulfopropyl-2-ethylhexyl maleate, sodium sulfopropyltridecylmaleate, sodium sulfopropyl tridecyl malate, and sodium sulfopropyl eicosyl malate.

Specific examples of the sulfoalkyl (meth)acrylamide include sodium sulfomethyl acrylamide, sodium sulfo-t-butyl acrylamide, sodium sulfo-s-butyl acrylamide, and sodium sulfo-t-butyl methacrylamide.

Specific examples of the sulfoalkyl (meth)acrylate include sodium sulfoethyl acrylate.

In a case of introduction by copolymerization, an olefin sulfonic acid or a salt thereof is suitably used among the unsaturated monomer containing a group of a sulfonic acid or a salt thereof.

In the present embodiment, other than the above copolymerization components, it is also possible to copolymerize about 0.1 mol % to 10 mol % of other monomers in a range that does not impair the object of the present invention. Examples of the other monomers include α-olefins such as ethylene, propylene, isobutylene, α-octene, α-dodecene, and α-octadecene; unsaturated acids such as acrylic acid, methacrylic acid, crotonic acid, maleic acid, maleic anhydride, and itaconic acid, or salts or mono- or di-alkyl esters thereof; nitriles such as acrylonitrile and methacrylonitrile; amides such as diacetone acrylamide, acrylamide, and methacrylamide; alkyl vinyl ethers; dimethyl allyl vinyl ketone; N-vinyl pyrrolidone; vinyl chloride; vinylidene chloride; polyoxyalkylene (meth)allyl ethers such as polyoxyethylene (meth)allyl ether and polyoxypropylene (meth)allyl ether; polyoxyalkylene (meth)acrylates such as polyoxyethylene (meth)acrylate and polyoxypropylene (meth)acrylate;

polyoxyalkylene (meth)acrylamides such as polyoxyethylene (meth)acrylamide and polyoxypropylene (meth)acrylamide; polyoxyethylene[1-(meth)acrylamide-1,1-dimethylpropyl] ester; polyoxyethylene vinyl ether; polyoxypropylene vinyl ether; polyoxyethylene allylamine; polyoxypropylene allylamine; polyoxyethylene vinylamine; and polyoxypropylene vinylamine.

Examples thereof further include cationic group-containing monomers such as N-acryl amidomethyl trimethyl ammonium chloride, N-acryl amidoethyl trimethyl ammonium chloride, N-acryl amidopropyl trimethyl ammonium chloride, 2-acryl oxyethyl trimethyl ammonium chloride, 2-methacryl oxyethyl trimethyl ammonium chloride, 2-hydroxy-3-methacryloyl oxypropyl trimethyl ammonium chloride, allyl trimethyl ammonium chloride, methallyl trimethyl ammonium chloride, 3-butene trimethyl ammonium chloride, dimethyl diallyl ammonium chloride, and diethyl diallyl ammonium chloride; acetoacetyl group-containing monomers; 3,4-diacetoxy-1-butene; 1,4-diacetoxy-2-butene; ethylene carbonate; vinyl ethylene carbonate; glycerin monoallyl ether; isopropenyl acetate; and 1-methoxy vinyl acetate.

Among them, an α-olefin-vinyl alcohol copolymer in which α-olefins such as ethylene, propylene, isobutylene, α-octene, α-dodecene, and α-octadecene are obtained as copolymerization components is preferable in view of emulsifying force improvement and viscosity stability of the aqueous solution, and a preferable content of such α-olefins is 0.1 mol % to 10 mol %.

The method of copolymerizing the vinyl ester monomer with the unsaturated monomer containing a group of a sulfonic acid or a salt thereof is not particularly limited, a publicly known method such as bulk polymerization, solution polymerization, suspension polymerization, dispersion polymerization, or emulsion polymerization can be adopted, but solution polymerization is performed in general.

A method of charging the monomer components during copolymerization is not particularly limited, and any method such as batch charging, divided charging, or continuous charging is adopted.

Examples of a solvent used in such copolymerization generally include lower alcohols such as methanol, ethanol, isopropyl alcohol, n-propanol, and butanol, and ketones such as acetone and methyl ethyl ketone, and industrially alcohols having 1 to 3 carbon atoms, particularly methanol, are suitably used.

An amount of the solvent may be appropriately selected in consideration of a chain transfer constant of the solvent conforming with a polymerization degree of a targeted copolymer, and for example, when the solvent is methanol, the amount is selected from a range of S (solvent)/M (monomer) of about 0.01 to 10 (mass ratio), preferably 0.05 to 3 (mass ratio).

At the time of copolymerization, a polymerization catalyst is preferably used, and examples of the polymerization catalyst include publicly known radical polymerization catalysts such as azobisisobutyronitrile, acetyl peroxide, benzoyl peroxide, and lauryl peroxide, and low temperature active radical polymerization catalysts such as azobisdimethyl valeronitrile and azobismethoxy dimethyl valeronitrile. An amount of the polymerization catalyst varies with the type of the monomer to be copolymerized and the type of the catalyst and is not determined sweepingly, but is arbitrarily selected depending on a polymerization rate. For example, when used, azoisobutyronitrile or acetyl peroxide is preferably 0.01 mol % to 1.0 mol %, particularly preferably 0.02 mol % to 0.5 mol % with respect to the vinyl ester monomer.

Further, the copolymerization reaction is performed at a reaction temperature of about 30° C. to a boiling point due to a solvent to be used or pressure, and more specifically, is performed in a range of 35° C. to 150° C., preferably 40° C. to 75° C.

The obtained copolymer is then saponified. Such saponification is performed using an alkali catalyst or an acid catalyst in which the copolymer obtained above is dissolved in an alcohol or an aqueous alcohol.

Examples of the alcohol include lower alcohols such as methanol, ethanol, propanol, and tert-butanol, and among them, alcohols having 1 to 3 carbon atoms, particularly methanol, are preferably used. A concentration of the copolymer in the alcohol is appropriately selected depending on viscosity of the system, but is generally selected from a range of 10% to 60% by mass.

Examples of the catalyst used in saponification include alkali catalysts like hydroxides or alcoholates of alkali metal such as sodium hydroxide, potassium hydroxide, sodium methylate, sodium ethylate, potassium methylate, and lithium methylate; and acid catalysts such as sulfuric acid, hydrochloric acid, nitric acid, methanesulfonic acid, zeolite, and a cation exchange resin.

A amount of such saponification catalyst is appropriately selected depending on a saponification method, a target degree of saponification, and the like. When the alkali catalyst is used, it is appropriate that a ratio thereof is generally 0.1 mmol to 30 mmol, preferably 2 mmol to 15 mmol with respect to a total amount 1 mol of the vinyl ester monomer and the compounds represented by the general formulae (6) to (12).

The reaction temperature of the saponification reaction is not particularly limited, but is preferably 10° C. to 60° C., and particularly preferably 20° C. to 50° C.

Thus, the PVA resin containing a group of a sulfonic acid or a salt thereof used in the present embodiment is obtained.

A content of the group of a sulfonic acid or a salt (modification rate) of the PVA resin containing a group of a sulfonic acid or a salt thereof is preferably 0.01 mol % to 10 mol %, particularly preferably 0.1 mol % to 7 mol %, and especially preferably 1 mol % to 5 mol %. When the content of the group of a sulfonic acid or a salt of the PVA resin containing a group of a sulfonic acid or a salt thereof is too low, separation tends to be slow; when the content is too high, production tends to be difficult.

An average degree of polymerization (measured in accordance with JIS K 6726) of the PVA resin containing a group of a sulfonic acid or a salt thereof is preferably 100 to 4000, more preferably 150 to 2500, and still more preferably 200 to 1000.

A viscosity reduction effect of oil tends to decrease when the average degree of polymerization is too small or too large.

An degree of saponification (measured in accordance with JIS K 6726) of the PVA resin containing a group of a sulfonic acid or a salt thereof is preferably 70 mol % to 100 mol %, more preferably 80 mol % to 100 mol %, and still more preferably 90 mol % to 100 mol %.

When the degree of saponification is too low, hydrophilicity decreases, so that the immediate separability from the crude oil tends to decrease.

The PVA resin containing a group of a sulfonic acid or a salt thereof used in the present embodiment may be one type or used in a mixture of two or more types, and when used in the mixture, the average degree of polymerization and an average value of the degree of saponification are preferably in the ranges described above.

[Oxyalkylene Group-Containing PVA Resin]

The polyvinyl alcohol resin containing an oxyalkylene group used in the present embodiment (hereinafter may be referred to as "oxyalkylene group-containing PVA resin") contains, for example, an oxyalkylene group having a structure represented by the following general formula (13).

[Chem. 14]

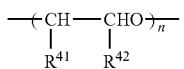

(13)

(In the formula (13), $R^{41}$ and $R^{42}$ each independently represent a hydrogen atom or an alkyl group having 1 to 4 carbon atoms, and n represents an integer of 1 to 20.)

It is presumed that by having an oxyalkylene group, the oxyalkylene group-containing PVA resin has high hydrophilicity, prevents adsorption of the oxyalkylene group-containing PVA resin to oil particles, and expresses excellent immediate separability. In addition, it is presumed that crystallinity is moderately disturbed and excellent viscosity reduction properties are exhibited since the PVA resin has an oxyalkylene group.

In the general formula (13), $R^{41}$ and $R^{42}$ each independently represent a hydrogen atom or an alkyl group having 1 to 4 carbon atoms. Examples of the alkyl group having 1 to 4 carbon atoms in $R^{41}$ and $R^{42}$ include a methyl group, an ethyl group, a propyl group, and a butyl group, and may be linear or branched. The alkyl group may be substituted with a halogen atom such as a fluorine atom, a chlorine atom, or a bromine atom. In view of improving the effects of the present invention, $R^{41}$ and $R^{42}$ are preferably a hydrogen atom, an ethyl group, or a methyl group, and more preferably a hydrogen atom or an ethyl group.

In addition, n is 1 to 20, preferably 5 to 15.

A molar fraction of the oxyalkylene group in the oxyalkylene group-containing PVA resin is preferably 0.1 mol % to 20 mol %, more preferably 0.1 mol % to 10 mol %, and still more preferably 0.1 mol % to 5 mol % in view of improving the effects of the present invention and in view of aqueous solution stability when the oxyalkylene group-containing PVA resin is mixed with water and used as a PVA resin aqueous solution.

The molar fraction refers to a ratio (mol %) of the number of moles of the oxyalkylene group to a total number of moles of a vinyl ester group, a vinyl alcohol group, and the oxyalkylene group added by modification in the oxyalkylene group-containing PVA resin. The molar fraction can be calculated by NMR.

The oxyalkylene group-containing PVA resin used in the present embodiment can be produced by any method. Examples thereof include (i) a method of copolymerizing the vinyl ester monomer in the presence of a polyoxyalkylene compound, (ii) a method of copolymerizing an unsaturated monomer having the oxyalkylene group represented by the general formula (13) with the vinyl ester monomer and then saponifying the copolymer, and (iii) a method of post-reacting an alkylene oxide with the polyvinyl alcohol resin. Among the above methods, the method (ii) is practical from the aspect of production and the aspect of performance of the resin.

Hereinafter, the method (ii) will be mainly described, but the present invention is not limited thereto.

Examples of the unsaturated monomer having an oxyalkylene group include various monomers, and typical examples thereof are as follows.

<(Meth)acrylic Ester Type>

The compound is represented by the following general formula (14), and specific examples thereof include polyoxyethylene (meth)acrylate and polyoxypropylene (meth)acrylate.

[Chem. 15]

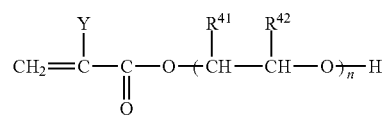

(14)

(In the formula (14), Y represents a hydrogen atom or a methyl group, $R^{41}$ and $R^{42}$ each independently represent a hydrogen atom or an alkyl group having 1 to 4 carbon atoms, and n represents an integer of 1 to 20.)

<(Meth)acrylamide Type>

The compound is represented by the following general formula (15), and specific examples thereof include polyoxyethylene (meth)acrylamide, polyoxypropylene (meth)acrylamide, and polyoxyethylene[1-(meth)acrylamide-1,1-dimethyl propyl] ester.

[Chem. 16]

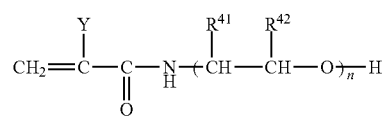

(15)

(In the formula (15), Y represents a hydrogen atom or a methyl group, $R^{41}$ and $R^{42}$ each independently represent a hydrogen atom or an alkyl group having 1 to 4 carbon atoms, and n represents an integer of 1 to 20.)

<(Meth)allyl Ether Type>

The compound is represented by the following general formula (16), and specific examples thereof include polyoxyethylene (meth)allyl ether and polyoxypropylene (meth)allyl ether.

[Chem. 17]

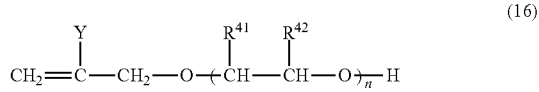

(16)

(In the formula (16), Y represents a hydrogen atom or a methyl group, $R^{41}$ and $R^{42}$ each independently represent a hydrogen atom or an alkyl group having 1 to 4 carbon atoms, and n represents an integer of 1 to 20.)

<Vinyl Ether Type>

The compound is represented by the following general formula (17), and specific examples thereof include polyoxyethylene vinyl ether and polyoxypropylene vinyl ether.

[Chem. 18]

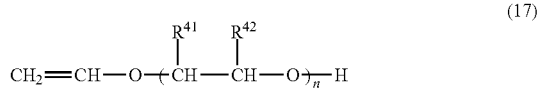

(17)

(In the formula (17), $R^{41}$ and $R^{42}$ each independently represent a hydrogen atom or an alkyl group having 1 to 4 carbon atoms, and n represents an integer of 1 to 20.)

In the formulae (14) to (17), preferable examples of $R^{41}$, $R^{42}$, and n in the formula are the same as those in the formula (13).

Among the unsaturated monomers containing an oxyalkylene group, those of the (meth)allyl ether type represented by the general formula (16) are suitably used in view of ease of the copolymerization reaction, stability in the saponification step, and the like.

Examples of the vinyl ester monomer that copolymerizes with the unsaturated monomers include vinyl formate, vinyl acetate, vinyl trifluoroacetate, vinyl propionate, vinyl butyrate, vinyl caprate, vinyl laurate, vinyl versatate, vinyl palmitate, vinyl stearate, and vinyl pivalate, and vinyl acetate is suitable industrially. These vinyl ester monomers can be used in one type or two or more types.

In addition to the unsaturated monomer and the vinyl ester monomer, a monomer having copolymerizability with these monomers may be copolymerized.

Examples of the copolymerizable monomer include: olefins such as ethylene, propylene, isobutylene, α-octene, α-dodecene, and α-octadecene; derivatives such as hydroxy group-containing α-olefins such as 3-buten-1-ol, 4-penten-1-ol, 5-hexen-1-ol, and 3,4-dihydroxy-1-butene, and acylated products thereof; unsaturated acids such as acrylic acid, methacrylic acid, crotonic acid, maleic acid, maleic anhydride, itaconic acid, and undecylenic acid, and salts, monoesters, and dialkyl esters thereof; nitriles such as acrylonitrile and methacrylonitrile; amides such as diacetone acrylamide, acrylamide, and methacrylamide; olefin sulfonic acids such as ethylene sulfonic acid, allyl sulfonic acid, and methallyl sulfonic acid or salts thereof; alkyl vinyl ethers; vinyl compounds such as dimethyl allyl vinyl ketone, N-vinyl pyrrolidone, vinyl chloride, vinyl ethylene carbonate, 2,2-dialkyl-4-vinyl-1,3-dioxolane, and glycerin monoallyl ether; substituted vinyl acetates such as isopropenyl acetate and 1-methoxy vinyl acetate; vinylidene chloride; 1,4-diacetoxy-2-butene; 1,4-dihydroxy-2-butene; and vinylene carbonate.

Examples thereof further include cationic group-containing monomers such as N-acryl amidomethyl trimethyl ammonium chloride, N-acryl amidoethyl trimethyl ammonium chloride, N-acryl amidopropyl trimethyl ammonium chloride, 2-acryl oxyethyl trimethyl ammonium chloride, 2-methacryl oxyethyl trimethyl ammonium chloride, 2-hydroxy-3-methacryloyl oxypropyl trimethyl ammonium chloride, allyl trimethyl ammonium chloride, methallyl trimethyl ammonium chloride, 3-butene trimethyl ammonium chloride, dimethyl diallyl ammonium chloride, and diethyl diallyl ammonium chloride.

An introduction amount of the copolymerizable monomer varies depending on the type of the monomer, but in general, is preferably 10 mol % or less, particularly preferably 5 mol % or less of the total structural unit. When the introduction amount of the copolymerizable monomer is too large, water solubility tends to be impaired.

At the time of copolymerization, a publicly known polymerization method can be used, such as solution polymerization, emulsion polymerization, and suspension polymerization. For example, solution polymerization using an alcohol such as methanol, ethanol, or isopropyl alcohol as a solvent is performed. As a method of charging the monomer in such solution polymerization, a method of batch charging all of the two monomers at an initial stage of polymerization or a method of continuously or intermittently supplying a vinyl ester monomer and/or a monomer having an oxyalkylene group may be used.

Examples of a solvent used in such copolymerization generally include lower alcohols such as methanol, ethanol, isopropyl alcohol, n-propanol, and butanol, and ketones such as acetone and methyl ethyl ketone, and methanol is suitably used industrially.

An amount of the solvent can be appropriately selected in consideration of a chain transfer constant of the solvent conforming with a polymerization degree of a targeted copolymer, for example, is selected from a range of S (solvent)/M (monomer) of about 0.01 to 10 (mass ratio) when the solvent is methanol.

At the time of copolymerization, a polymerization catalyst is preferably used, and examples of the polymerization catalyst include publicly known radical polymerization catalysts such as azobisisobutyronitrile, acetyl peroxide, benzoyl peroxide, and lauryl peroxide, and low temperature active radical polymerization catalysts such as azobisdimethyl valeronitrile and azobismethoxy dimethyl valeronitrile. An amount of the polymerization catalyst varies with the type of the monomer to be copolymerized and the type of the catalyst and is not determined sweepingly, but is arbitrarily selected depending on a polymerization rate. For example, when used, azoisobutyronitrile or acetyl peroxide is generally 0.01 mol % to 0.7 mol %, particularly preferably 0.02 mol % to 0.5 mol % with respect to the vinyl ester monomer.

Further, the copolymerization reaction is performed at a reaction temperature of about 30° C. to a boiling point due to a solvent to be used or pressure, and more specifically, is performed in a range of 35° C. to 90° C., preferably 40° C. to 75° C.

The obtained copolymer is then saponified. Such saponification is performed using an alkali catalyst or an acid catalyst in which the copolymer obtained above is dissolved in a solvent such as alcohol. Examples of the typical solvent include methanol, ethanol, propanol, and tert-butanol, but methanol is particularly preferably used. A concentration of the copolymer in the alcohol is appropriately selected depending on viscosity of the system, for example, selected from a range of 10% to 60% by mass.

Examples of the catalyst used in saponification include alkali catalysts like hydroxides or alcoholates of alkali metal such as sodium hydroxide, potassium hydroxide, sodium methylate, sodium ethylate, potassium methylate, and lithium methylate; and acid catalysts such as sulfuric acid, hydrochloric acid, nitric acid, methanesulfonic acid, zeolite, and a cation exchange resin.

An amount of such saponification catalyst is appropriately selected depending on a saponification method, a target degree of saponification, and the like. When the alkali catalyst is used, it is appropriate that a ratio thereof is 0.1 mmol to 30 mmol, preferably 2 mmol to 20 mmol with respect to 1 mol of the vinyl ester monomer.

A reaction temperature of the saponification reaction is preferably 10° C. to 60° C., more preferably 20° C. to 50° C.

In this way, the oxyalkylene group-containing PVA resin used in the present embodiment is obtained.

A content of the oxyalkylene group (modification rate) in the oxyalkylene group-containing PVA resin is preferably 0.01 mol % to 10 mol %, particularly preferably 0.1 mol % to 7 mol %, and especially preferably 1 mol % to 5 mol %. When the content of the oxyalkylene group of the oxyalkylene group-containing PVA resin is too low, separation from crude oil after the oil recovery agent was added to the crude oil to form an oil dispersion tends to be slow; when the content is too high, production tends to be difficult.

An average degree of polymerization (measured in accordance with JIS K 6726) of the oxyalkylene group-containing PVA resin is preferably 100 to 4000, more preferably 200 to 4000, still more preferably 300 to 2000, and particularly preferably 500 to 1000. No matter the average degree of polymerization is too low or too high, it tends to be difficult to obtain a viscosity reduction effect of oil.

An degree of saponification (measured in accordance with JIS K 6726) of the oxyalkylene group-containing PVA resin is preferably 70 mol % to 100 mol %, more preferably 80 mol % to 100 mol %, and still more preferably 90 mol % to 100 mol %.

When the degree of saponification is too low, hydrophilicity decreases, so that the immediate separability from the crude oil tends to decrease.

The oxyalkylene group-containing PVA resin used in the present embodiment may be one type or used in a mixture of two or more types, and when used in the mixture, the average degree of polymerization and an average value of the degree of saponification are preferably in the ranges described above.

[Oil Recovery Agent]

The oil recovery agent of the present invention contains the PVA resin of the present invention. The oil recovery agent is added directly or by being mixed with excavation water to the crude oil. The oil recovery agent may be an oil recovery agent containing the PVA resin of the present invention, but is preferably used in a form of an aqueous solution suitably mixed with water. Using as an aqueous solution is effective since it is easy to be uniformly mixed with crude oil. As water, tap water or water containing salt and other impurities such as seawater and groundwater can be used.

When the oil recovery agent is in the form of an aqueous solution, the content of the PVA resin of the present invention in the oil recovery agent may be appropriately adjusted depending on the type and modified species of the PVA resin, but is preferably in a range of 0.05 to 40 parts by mass, and more preferably 0.1 to 10 parts by mass with respect to 100 parts by mass of water.

Specifically, when the PVA resin of the present invention is an unmodified PVA resin, a content of the resin is preferably 0.1 to 10 parts by mass, more preferably 0.5 to 5 parts by mass, and still more preferably 0.5 to 3 parts by mass with respect to 100 parts by mass of water. When the PVA resin of the present invention is a PVA resin having a primary hydroxyl group on the side chain, a content of the resin is preferably 0.1 to 10 parts by mass, more preferably 0.5 to 5 parts by mass, and still more preferably 0.5 to 3 parts by mass with respect to 100 parts by mass of water. When the PVA resin of the present invention is a PVA resin containing a group of a sulfonic acid or a salt thereof, a content of the resin is preferably 0.05 to 40 parts by mass, more preferably 0.1 to 10 parts by mass, still more preferably 0.5 to 5 parts by mass, and particularly preferably 0.5 to 3 parts by mass with respect to 100 parts by mass of water. When the PVA resin of the present invention is an oxyalkylene group-containing PVA resin, a content of the resin is preferably 0.05 to 40 parts by mass, more preferably 0.1 to 10 parts by mass, still more preferably 0.5 to 5 parts by mass, and particularly preferably 0.5 to 3 parts by mass with respect to 100 parts by mass of water.

When a concentration of the PVA resin of the present invention in the oil recovery agent is too low, an amount of the oil recovery agent tends to be too large, and recovery performance of the crude oil tends to decrease. When the concentration of the PVA resin of the present invention is too high, viscosity of the oil recovery agent itself tends to rise.

In the oil recovery agent of the present invention, an aliphatic polyester resin, modified starch, polyglycolic acid, and the like can be used in combination as PVA resins other than the PVA resin of the present invention or other biodegradable resins.

When the PVA resins other than the PVA resin of the present invention are used in combination, ranges of a degree of saponification, an average degree of polymerization, and a degree of modification are preferably the same as those of the PVA resin of the present invention.

As necessary, various additives, for example, publicly known stabilizers or surfactants, solvents other than water (for example, lower alcohols such as methanol and ethanol), and the like can be contained.

[Oil Recovery Method]

The oil recovery agent of the present invention is added to crude oil present in the subterranean reservoir, and the crude oil is recovered as an oil dispersion whose viscosity is reduced by the oil recovery agent of the present invention.

A method of recovering crude oil contained in a stratum using the oil recovery agent of the present invention includes a pumping-up step of pumping up crude oil whose viscosity is reduced by adding the oil recovery agent to the crude oil and a step of separating the oil recovery agent from the pumped crude oil.

Crude oil refers to an untreated or unrefined mineral oil recovered from an oil well in the stratum, and contains a hydrocarbon as a main component and a compound containing a small amount of sulfur, oxygen, and nitrogen.

Examples of the crude oil to which the oil recovery method of the present invention can be applied include particularly light crude oil, light crude oil, medium-gravity crude oil, heavy crude oil, particularly heavy crude oil, bitumen (oil sand), tar, and pitch. The oil recovery agent can be used for various kinds of crude oil regardless of a hydrocarbon content and a sulfur content, but is preferably used for crude oil having an API degree of less than 39°, and more preferably used for crude oil having an API degree of 26° or more and less than 39°. Specifically, light crude oil (API degree 34° to 38.99°), medium-gravity crude oil (API degree 30° to 33.99°), and heavy crude oil (API degree 26° to 29.99°) are preferable. When the API degree is too high, it is difficult to obtain the effects of the present invention in some cases, but with respect to crude oil having an API degree of less than 39°, viscosity reduction properties due to the oil recovery agent of the present invention is easily obtained, and excellent immediate separability can be obtained.

The API degree is calculated by the following formula.

API degree=141.5/$G$−131.5

In the formula, G shows specific gravity of crude oil at 15.6° C. (60° F.). The "specific gravity" means specific gravity measured in accordance with "a method of testing density of crude oil and a petroleum product and a density, mass, and capacity conversion table" defined in KS K 2249.

(Pumping-Up Step)

In the pumping-up step, the oil recovery agent of the present invention is added to the crude oil as the oil dispersion, and crude oil with reduced viscosity (oil dispersion) is pumped up. By adding the oil recovery agent of the present invention to the crude oil, the PVA resin of the present invention in the oil recovery agent is dispersed in the crude oil, thereby reducing the viscosity of the crude oil. For example, the crude oil is a high viscosity fluid of about 3000 mPa·s to 50000 mPa·s, but by adding the oil recovery agent of the present invention to the crude oil, the viscosity of the oil dispersion containing the oil recovery agent can be reduced to for example, 50 mPa·s to 1000 mPa·s, preferably 100 mPa·s to 300 mPa·s.

A content of the oil recovery agent in the oil dispersion may be appropriately adjusted depending on the type and modified species of the PVA resin, but is preferably in a range of 0.05 to 200 parts by mass, more preferably 0.5 to 200 parts by mass, still more preferably 0.5 to 100 parts by mass, and particularly preferably 10 to 100 parts by mass with respect to 100 parts by mass of the crude oil.

Specifically, when an unmodified PVA resin is used as the PVA resin of the present invention, the oil recovery agent is added in preferably 0.05 to 200 parts by mass, more preferably 0.5 to 200 parts by mass, still more preferably 0.5 to 100 parts by mass, particularly preferably 10 to 60 parts by mass, and most preferably 20 to 50 parts by mass with respect to 100 parts by mass of the crude oil. When the PVA resin having a primary hydroxyl group in the side chain is used as the PVA resin of the present invention, the oil recovery agent is added in preferably 0.05 to 200 parts by mass, more preferably 0.5 to 200 parts by mass, still more preferably 0.5 to 100 parts by mass, particularly preferably 10 to 60 parts by mass, and most preferably 20 to 50 parts by mass with respect to 100 parts by mass of the crude oil. When the PVA resin containing a group of a sulfonic acid or a salt thereof is used as the PVA resin of the present invention, the oil recovery agent is added in preferably 0.05 to 200 parts by mass, more preferably 0.5 to 200 parts by mass, furthermore preferably 0.5 to 100 parts by mass, still more preferably 10 to 100 parts by mass, particularly preferably 10 to 60 parts by mass, and most preferably 20 to 40 parts by mass with respect to 100 parts by mass of the crude oil. When the oxyalkylene group-containing PVA resin is used as the PVA resin of the present invention, the oil recovery agent is added in preferably 0.05 to 200 parts by mass, more preferably 0.5 to 200 parts by mass, furthermore preferably 0.5 to 100 parts by mass, still more preferably 10 to 100 parts by mass, particularly preferably 10 to 60 parts by mass, and most preferably 20 to 40 parts by mass with respect to 100 parts by mass of the crude oil.

The PVA resin of the present invention is preferably added in a range of $5 \times 10^{-5}$ to 4 parts by mass, preferably 0.01 to 4 parts by mass, and more preferably 0.02 to 4 parts by mass with respect to 100 parts by mass of the crude oil, a concentration of the PVA resin of the present invention in the oil recovery agent (water, the PVA resin of the present invention, and an aqueous solution containing other additives as necessary) may be adjusted such that the content of the oil recovery agent is within the above range and the content of the PVA resin of the present invention is within the above range with respect to 100 parts by mass of the crude oil. When the content of the oil recovery agent in the oil dispersion is in the above range, the viscosity of the crude oil can be sufficiently reduced, so that smooth pumping up can be performed in the pumping-up step.

A method of adding the oil recovery agent is not particularly limited, and for example, a method of mixing excavation water containing the oil recovery agent with the crude oil as pretreatment of pipeline transport is a preferable embodiment, and a method of injecting the excavation water containing the oil recovery agent into the reservoir and dispersing the crude oil in the reservoir is also a preferable embodiment.

(Separation Step)

In the separation step, the oil recovery agent is separated from the pumped crude oil (oil dispersion) to recover the crude oil. As the separation method, since the pumped crude oil is separated into a crude oil layer (upper layer) and an excavation water layer (lower layer) containing the oil recovery agent by being left to stand as it is, so that the raw oil layer can be separated from the excavation water layer by suction, decantation, or the like.

In the present invention, since the oil recovery agent has excellent immediate separability from the crude oil, the crude oil and the excavation water are rapidly separated by presenting a clear interface. In the present invention, separation of the crude oil and the excavation water can be performed for about 10 to 60 minutes.

By using the oil recovery agent of the present invention, the crude oil can be efficiently recovered by the oil recovery method of the present invention, and the separated excavation water can be reused for excavation.

EXAMPLES

Hereinafter, the present invention is described more specifically by referring to Examples and Comparative Examples, but the present invention is not limited to these Examples. In the following Examples and Comparative Examples, "part" and "%" are based on mass, unless otherwise specified.

A method of testing viscosity reduction properties and immediate separability performed by evaluation of the following Examples and Comparative Examples is as follows.

[Viscosity Reduction Properties]

A temperature of a glass container containing a mixed liquid of a PVA resin aqueous solution and heavy oil was adjusted in a constant temperature bath of 25° C., and then the glass container was shaken up and down 50 times by hand to obtain a dispersion of the PVA resin aqueous solution and the heavy oil, and viscosity of the dispersion was measured with a B-type viscometer (spindle 4).

[Immediate Separability]

A temperature of a glass container containing a mixed liquid of a PVA resin aqueous solution and heavy oil was adjusted in a constant temperature bath of 25° C., and then the glass container was shaken up and down 50 times by hand to obtain a dispersion of the PVA resin aqueous solution and the heavy oil, the glass container containing the dispersion was placed in a 25° C. constant temperature water bath for 30 minutes, and a separation state of the PVA resin aqueous solution and the heavy oil was visually observed and evaluated with the following criteria.

<Evaluation Criteria>

A: A PVA resin aqueous solution layer and a heavy oil layer are clearly separated, and boundaries thereof are clear.

B: The PVA resin aqueous solution layer and the heavy oil layer are separated, but boundaries thereof are not clear, and they are mixed with each other.

C: The whole is muddy (the PVA resin solution and the heavy oil are not separated).

Test Example 1

Example 1-1

PVA 1-1

Unmodified PVA (PVA 1-1) having a degree of saponification of 99 mol % and an average degree of polymerization of 500 was prepared as an oil recovery agent.

Measurement of Water Contact Angle

First, 10% by mass of an aqueous solution of PVA 1-1 (PVA 1-1 aqueous solution) was prepared, and 13 g of the obtained PVA 1-1 aqueous solution was poured into a frame of longitudinal×transversal=10 cm×10 cm and left to stand for 3 days under an environment of 23° C. and 50% RH to prepare a cast film having a thickness of 100 μm.

Next, immediately after the prepared cast film was placed horizontally and 0.2 μl of purified water dripped to form a water drop under conditions of 23° C. and 50% RH, a contact angle between the water drop and a surface of the cast film surface was measured with a contact angle meter (DropMaster 500: manufactured by KYOWA INTERFACE SCIENCE). The contact angle was measured ten times, and the average value was taken as a water contact angle of PVA 1-1.

The water contact angle of PVA 1-1 was 65.8°.

<Preparation of Mixed Liquid>

A 0.5% aqueous solution (solvent: water) of the PVA 1-1 obtained above was prepared (hereinafter may be referred to as "PVA resin aqueous solution"). 10 parts of the PVA resin aqueous solution and 90 parts of heavy oil (manufactured by KYGNUS, API degree was 26° or more and less than 39°) were put into a glass container with a lid and mixed to obtain a mixed liquid of the PVA resin aqueous solution and the heavy oil (the mixed liquid contains 0.05 part of PVA 1-1).

Viscosity reduction properties and immediate separability were evaluated by using the obtained mixed liquid. The results are shown in Table 1.

Comparative Example 1-1

A similar test was performed as Example 1-1 by using only the heavy oil but without using the oil recovery agent. The results are shown in Table 1.

Comparative Example 1-2

Unmodified PVA (PVA 1-2) having a degree of saponification of 88 mol % and an average degree of polymerization of 600 was prepared.

An evaluation was performed in the same manner as in Example 1-1 except that PVA 1-2 was used instead of PVA 1-1 in Example 1-1. The results are shown in Table 1.

TABLE 1

|  | PVA resin | | | | Evaluation | |
| --- | --- | --- | --- | --- | --- | --- |
|  | Type of PVA resin | Degree of saponification (mol %) | Average degree of polymerization | Water contact angle (°) | Viscosity (mPa · s) | Immediate separability |
| Example 1-1 | PVA 1-1 | 99 | 500 | 65.8 | 484 | A |
| Comparative Example 1-1 | — | — | — | — | 1720 | C |
| Comparative Example 1-2 | PVA 1-2 | 88 | 600 | 72.0 | 800 | B |

In Example 1-1, the viscosity reduction effect was high, and further the immediate separability was excellent. On the other hand, Comparative Example 1-1 in which the PVA resin was not used and Comparative Example 1-2 in which the PVA resin having a water contact angle greater than 70° was used had poor viscosity reduction effect, high viscosity, and poor immediate separability.

Test Example 2

Example 2-1

Production of PVA 2-1

A PVA resin 2-1 (PVA 2-1) having a 1,2-diol structure in the side chain was prepared as an oil recovery agent.

85 parts of vinyl acetate (initial charge of 10% of the total), 460 parts of methanol, and 7.6 part of 3,4-diacetoxy-1-butene were charged, and 0.32 part of azobisisobutyronitrile was put into a reaction can including a reflux condenser, a dropping funnel, and a stirrer, the temperature was raised under a nitrogen gas stream while stirring was performed, and polymerization was started. Further, 765 parts of vinyl acetate were dripped over 8 hours (dripping speed: 95.6 parts/hr) 0.5 hour after start of polymerization. 0.2 part of azobisisobutyronitrile was added 2.5 hours and 4.5 hours after the start of polymerization respectively, and when a polymerization rate of vinyl acetate was 85%, a predetermined amount of m-dinitrobenzene was added to terminate the polymerization, and next unreacted vinyl acetate monomers were removed out of the system by distillation while blowing methanol vapor to obtain a methanol solution of a copolymer.

Then, the above solution was diluted with methanol, a solid content concentration was adjusted to 50%, the methanol solution was charged into a kneader, and a methanol solution in which sodium in sodium hydroxide is 2% was added at a ratio of 9 mmol to a total amount of 1 mol of vinyl acetate structural units and 3,4-diacetoxy-1-butene structural units in the copolymer while maintaining the solution temperature at 35° C. to perform saponification. When a saponified product was precipitated and became particulate as the saponification proceeded, 4 mmol of a methanol solution of 2% sodium in sodium hydroxide was further added to a total amount of 1 mol of vinyl acetate structural units and 3,4-diacetoxy-1-butene structural units in the copolymer to perform the saponification. Then, 0.8 equivalent of sodium hydroxide was added to acetic acid for neutralization, filtered, washed with methanol, and dried in a hot air dryer to obtain the PVA resin (PVA 2-1) having a 1,2-diol structure in the side chain.

The degree of saponification of the obtained PVA resin (PVA 2-1) having a 1,2-diol structure in the side chain was 99 mol % when analyzed with the amount of alkali consumption required for hydrolysis of the remaining vinyl acetate and 3,4-diacetoxy-1-butene in the resin. The average degree of polymerization was 600 when analyzed in accordance with JIS K 6726.

The content of 1,2-diol structural unit represented by the above formula (1') was 8 mol % when calculated from the integrated value measured by $^1$H-NMR (300 MHz proton NMR, d6-DMSO solution, internal standard substance; tetramethylsilane, 50° C.).

When the water contact angle was measured in accordance with the method described in Example 1-1, the water contact angle when a film was formed was 65.3°.

<Preparation of Mixed Liquid>

A 0.5% aqueous solution (solvent: water) of PVA 2-1 obtained above was prepared (hereinafter referred to as "PVA resin aqueous solution"). 10 parts of the PVA resin aqueous solution and 90 parts of heavy oil (manufactured by KYGNUS, API degree was 26° or more and less than 39°) were put into a glass container with a lid and mixed to obtain a mixed liquid of the PVA resin aqueous solution and the heavy oil (the mixed liquid contains 0.05 part of PVA 2-1).

Viscosity reduction properties and immediate separability were evaluated by using the obtained mixed liquid. The results are shown in Table 2.

Example 2-2

PVA 2-2 of which a degree of saponification, an average degree of polymerization, a content of 1,2-diol structural units and a water contact angle are as shown in Table 2 was produced in accordance with the method shown in the above <Production of PVA 2-1>. PVA 2-2 was used instead of PVA 2-1 to prepare an PVA resin aqueous solution, and viscosity reduction properties and immediate separability were evaluated in the same manner as in Example 2-1. The results are shown in Table 2.

Example 2-3

PVA 2-3 of which a degree of saponification, an average degree of polymerization, a content of 1,2-diol structural units and a water contact angle are as shown in Table 2 was produced in accordance with the method shown in the above <Production of PVA 2-1>.

PVA 2-3 was used instead of PVA 2-1 to prepare an PVA resin aqueous solution, and viscosity reduction properties and immediate separability were evaluated in the same manner as in Example 2-1. The results are shown in Table 2.

Example 2-4

PVA 2-4 of which a degree of saponification, an average degree of polymerization, a content of 1,2-diol structural units and a water contact angle are as shown in Table 2 was produced in accordance with the method shown in the above <Production of PVA 2-1>.

PVA 2-4 was used instead of PVA 2-1 to prepare an PVA resin aqueous solution, and viscosity reduction properties and immediate separability were evaluated in the same manner as in Example 2-1. The results are shown in Table 2.

Comparative Example 2-1

A similar test was performed as in Example 2-1 by using only the heavy oil but without using the oil recovery agent. The results are shown in Table 2.

Comparative Example 2-2

Unmodified PVA (PVA 2-6) having a degree of saponification of 88 mol %, an average degree of polymerization of 600, and a water contact angle of 72.0° when formed into a film was prepared.

PVA 2-6 was used instead of PVA 2-1 to prepare an PVA resin aqueous solution, and viscosity reduction properties and immediate separability were evaluated in the same manner as in Example 2-1. The results are shown in Table 2.

TABLE 2

| | | PVA resin | | | | | Evaluation | |
|---|---|---|---|---|---|---|---|---|
| | Type of PVA resin | Degree of saponification (mol %) | Average degree of polymerization | Modified species | Modification rate (mol %) | Water contact angle (°) | Viscosity (mPa · s) | Immediate separability |
| Example 2-1 | PVA 1-1 | 99 | 600 | side chain 1,2-diol | 8 | 65.8 | 144 | A |
| Example 2-2 | PVA 2-2 | 99 | 300 | side chain 1,2-diol | 3 | 56.4 | 282 | A |
| Example 2-3 | PVA 2-3 | 98 | 1200 | side chain 1,2-diol | 6 | 68.3 | 304 | A |

TABLE 2-continued

| | PVA resin | | | | | Evaluation | |
|---|---|---|---|---|---|---|---|
| Type of PVA resin | Degree of saponification (mol %) | Average degree of polymerization | Modified species | Modification rate (mol %) | Water contact angle (°) | Viscosity (mPa · s) | Immediate separability |
| Example 2-4 PVA 2-4 | 99 | 2500 | side chain 1,2-diol | 2 | 65.0 | 394 | A |
| Comparative Example 2-1 — | — | — | — | — | — | 1720 | C |
| Comparative Example 2-2 PVA 2-6 | 88 | 600 | — | — | 72.0 | 800 | B |

In Examples 2-1 to 2-4, the viscosity reduction effect was high, and further the immediate separability was excellent. On the other hand, Comparative Example 2-1 in which the PVA resin was not used and Comparative Example 2-2 in which the unmodified PVA resin having a water contact angle greater than 70° was used had poor viscosity reduction effect, high viscosity, and poor immediate separability.

Test Example 3

Example 3-1

Production of PVA 3-1

A PVA resin 3-1 (PVA 3-1) containing a group of a sulfonic acid or a salt thereof was prepared as an oil recovery agent.

1000 parts of vinyl acetate, 422 parts of methanol, and 62 parts of sodium allyl sulfonate (3.2 mol % with respect to vinyl acetate) were charged, and 0.072 mol % of acetyl peroxide (with respect to the charged vinyl acetate) were put into a reaction can including a reflux condenser, a dropping funnel, and a stirrer, the temperature was raised while stirring, and polymerization was performed while flowing back.

During the polymerization, 0.072 mol % of acetyl peroxide (with respect to the charged vinyl acetate) was put in four times, and when a polymerization rate of vinyl acetate was 96.0%, 0.1 part of p-methoxy phenol was added thereto to terminate the polymerization, and next unreacted vinyl acetate monomers were removed out of the system by a method of blowing in methanol vapor to obtain a methanol solution of a copolymer.

Then, the above solution was diluted with methanol, a solid content concentration was adjusted to 55%, the methanol solution was charged into a kneader, and a methanol solution of sodium hydroxide (2% in sodium concentration) was added at a ratio of 8 mmol to 1 mol of vinyl acetate structural units in the copolymer while maintaining the solution temperature at 35° C. to perform saponification. When a saponified product was precipitated and became particulate as the saponification proceeded, the saponified product was filtered, well washed with a mixed liquid of methanol and methyl acetate (methanol: methyl acetate=2: 8), and dried in a hot air dryer to obtain the PVA resin 3-1 (PVA 3-1) containing a group of a sulfonic acid or a salt thereof.

The degree of saponification of the obtained PVA resin 3-1 (PVA 3-1) containing a group of a sulfonic acid or a salt thereof was 99.3 mol % when analyzed in accordance with JIS K 6726, viscosity (degree of polymerization) of a 4% aqueous solution at 20° C. was 2.6 mPa·s when measured in accordance with JIS K 6726, and an average degree of polymerization was 200. In addition, a modification amount of PVA 3-1 was 2.7 mol % in a sulfonic acid group when calculated by NMR measurement.

When the water contact angle was measured in accordance with the method described in Example 1-1, the water contact angle when a film was formed was 52.7°.

<Preparation of Mixed Liquid>

A 5% aqueous solution (solvent: water) of PVA 3-1 obtained above was prepared (hereinafter referred to as "PVA resin aqueous solution"). 30 parts of the PVA resin aqueous solution and 70 parts of heavy oil (manufactured by KYGNUS, API degree was 26° or more and less than 39°) were put into a glass container with a lid to obtain a mixed liquid of the PVA resin aqueous solution and the heavy oil (the mixed liquid contains 0.15 part of PVA 3-1).

Viscosity reduction properties and immediate separability were evaluated by using the obtained mixed liquid. The results are shown in Table 3.

Example 3-2

A PVA resin 3-2 (PVA 3-2) containing a group of a sulfonic acid or a salt thereof was obtained by production in the same manner in the above <Production of PVA 3-1> except that sodium hydroxide at the time of saponification was reduced and the degree of saponification was 87.3 mol %.

The degree of saponification of the obtained PVA 3-2 was 87.3 mol % when analyzed in accordance with JIS K 6726, viscosity (degree of polymerization) of a 4% aqueous solution at 20° C. was 2.5 mPa·s when measured in accordance with JIS K 6726, and an average degree of polymerization was 200. In addition, a modification amount of PVA 3-2 was 2.7 mol % in a sulfonic acid group when calculated by NMR measurement. In addition, a water contact angle when a film was formed was 67.0°.

Evaluations of viscosity reduction properties and immediate separability were performed in the same manner as in Example 3-1 except that PVA 3-2 was used instead of PVA 3-1 in Example 3-1 to prepare a PVA resin aqueous solution. The results are shown in Table 3.

Comparative Example 3-1

A similar test was performed as Example 3-1 by using only the heavy oil but without using the oil recovery agent. The results are shown in Table 3.

Comparative Example 3-2

Unmodified PVA (PVA 3-3) having a degree of saponification of 88 mol %, an average degree of polymerization of 600, and a water contact angle of 72.0° when formed into a film was prepared.

Evaluations of viscosity reduction properties and immediate separability were performed in the same manner as in Example 3-1 except that PVA 3-3 was used instead of PVA 3-1 in Example 3-1 to prepare a PVA resin aqueous solution. The results are shown in Table 3.

Comparative Example 3-3

Unmodified PVA (PVA 3-4) having a degree of saponification of 88 mol %, an average degree of polymerization of 1700, and a water contact angle of 71.4° when formed into a film was prepared.

Evaluations of viscosity reduction properties and immediate separability were performed in the same manner as in Example 3-1 except that PVA 3-4 was used instead of PVA 3-1 in Example 3-1 to prepare a PVA resin aqueous solution. The results are shown in Table 3.

Then, residual monomers were removed from a solution of the polyoxyethylene group-containing vinyl acetate polymer obtained above, and diluted with methanol to adjust a solid content concentration to 40%. The methanol solution was charged into a kneader, and a 2% methanol solution of sodium hydroxide was added in an amount of 3.5 mmol with respect to 1 mol unit of vinyl acetate in a copolymer while maintaining the solution temperature at 35° C. to perform saponification. The saponified product was precipitated and finally became particulate as the saponification proceeded. The produced resin was filtered, washed well with methanol, and dried in a hot air dryer to obtain the oxyalkylene group-containing PVA resin 4-1 (PVA 4-1).

A degree of saponification of the obtained oxyalkylene group-containing PVA resin 4-1 (PVA 4-1) was 99.2 mol % when analyzed in accordance with JIS K 6726, an average degree of polymerization thereof was 750 when analyzed in

TABLE 3

| | PVA resin | | | | | | Evaluation | |
|---|---|---|---|---|---|---|---|---|
| | Type of PVA resin | Degree of saponification (mol %) | Average degree of polymerization | Modified species | Modification rate (mol %) | Water contact angle (°) | Viscosity (mPa · s) | Immediate separability |
| Example 3-1 | PVA 3-1 | 99.3 | 200 | sulfonic acid | 2.7 | 52.7 | 234 | A |
| Example 3-2 | PVA 3-2 | 87.3 | 200 | sulfonic acid | 2.7 | 67.0 | 258 | A |
| Comparative Example 3-1 | — | — | — | — | — | — | 1720 | C |
| Comparative Example 3-2 | PVA 3-3 | 88 | 600 | — | — | 72.0 | 356 | B |
| Comparative Example 3-3 | PVA 3-4 | 88 | 1700 | — | — | 71.4 | 1400 | B |

From the results in Table 3, it was found that Examples 3-1 and 3-2 using the oil recovery agent of the present invention containing a polyvinyl alcohol resin having a group of a sulfonic acid or a salt thereof were more excellent in viscosity reduction properties and immediate separability than Comparative Examples 3-1 to 3-3.

Test Example 4

Example 4-1

Production of PVA 4-1

An oxyalkylene group-containing PVA resin 4-1 (PVA 4-1) was prepared as an oil recovery agent.

15.0 parts of polyoxyethylene monoallyl ether where an average chain length (n) of an oxyethylene group is 15, 85 parts of vinyl acetate, and 10.0 parts of methanol were charged into a polymerization can, and flowed back for 30 minutes after being heated to a reflux state, and then 0.08 mol % of azobisisobutyronitrile with respect to the amount of vinyl acetate was charged to start polymerization. 0.08 mol % of azobisisobutyronitrile with respect to the amount of vinyl acetate was added 2 hours and 4 hours after the start of the reaction, respectively.

Then, 20 parts of methanol for cooling and 0.2 part of m-dinitrobenzene as an inhibitor were added about 10 hours after the start of the polymerization reaction, and a reaction can jacket was cooled to stop the polymerization reaction to obtain a polyoxyethylene group-containing vinyl acetate polymer. A polymerization rate of the polymer was about 95%.

accordance with JIS K 6726. A mole fraction of the oxyalkylene group in PVA 4-1 (modification rate) was 2.0 mol %.

When a water contact angle was measured in accordance with the method described in Example 1-1, the water contact angle when a film was formed was 58.6°.

<Preparation of Mixed Liquid>

A 0.5% aqueous solution (solvent: water) of PVA 4-1 obtained above was prepared (hereinafter referred to as "PVA resin aqueous solution").

10 parts of the PVA resin aqueous solution and 90 parts of heavy oil (manufactured by KYGNUS, API degree was 26° or more and less than 39°) were put into a glass container with a lid to obtain a mixed liquid 1 of the PVA resin aqueous solution and the heavy oil (the mixed liquid 1 contains 0.05 part of PVA 4-1).

In addition, 30 parts of the PVA resin aqueous solution and 70 parts of heavy oil (manufactured by KYGNUS, API degree was 26° or more and less than 39°) were put into a glass container with a lid to obtain a mixed liquid 2 of the PVA resin aqueous solution and the heavy oil (the mixed liquid 2 contains 0.15 part of PVA 4-1).

Viscosity reduction properties was evaluated by using the obtained mixed liquid 1, and immediate separability was evaluated by using the mixed liquid 2. The results are shown in Table 4.

Comparative Example 4-1

A similar test was performed as Example 4-1 by using only the heavy oil but without using the oil recovery agent. The results are shown in Table 4.

Comparative Example 4-2

Unmodified PVA (PVA 4-2) having a degree of saponification of 88 mol %, an average degree of polymerization of 600, and a water contact angle of 72.0° when formed into a film was prepared.

In Example 4-1, PVA 4-2 was used instead of PVA 4-1 to prepare an PVA resin aqueous solution, and viscosity reduction properties and immediate separability were evaluated in the same manner as in Example 4-1. The results are shown in Table 4.

TABLE 4

| | PVA resin | | | | | | Evaluation | |
|---|---|---|---|---|---|---|---|---|
| | Type of PVA resin | Degree of saponification (mol %) | Average degree of polymerization | Modified species | Modification rate (mol %) | Water contact angle (°) | Viscosity (mPa · s) | Immediate separability |
| Example 4-1 | PVA 4-1 | 99.2 | 750 | Oxyalkylene group | 2.0 | 58.6 | 272 | A |
| Comparative Example 4-1 | — | — | — | — | — | — | 1720 | C |
| Comparative Example 4-2 | PVA 4-2 | 88 | 600 | — | — | 72.0 | 800 | B |

From the results in Table 4, it was found that Example 4-1 using the oil recovery agent of the present invention containing a polyvinyl alcohol resin having an oxyalkylene group was more excellent in viscosity reduction properties and immediate separability than Comparative Examples 4-1 to 4-2.

While the present invention has been described in detail and with reference to specific embodiments, it will be apparent to those skilled in the art that various changes and modifications can be made without departing from the spirit and scope of the present invention. The present application is based on Japanese Patent Application Nos. 2017-173426, 2017-173427, 2017-173428, and 2017-173429 filed on Sep. 8, 2017, contents of which are incorporated herein as reference.

The invention claimed is:

1. An oil recovery agent, which is an aqueous solution, comprising:
 a polyvinyl alcohol resin having a 1,2-diol structure in its side chain, and having a water contact angle of 70° or less when formed into a film, wherein
 an average degree of polymerization of the polyvinyl alcohol resin is 100 to 300, and
 a content of the polyvinyl alcohol resin is 0.5 to 5 parts by mass with respect to 100 parts by mass of water.

2. The oil recovery agent according to claim 1, wherein the content of the polyvinyl alcohol resin is 0.5 to 3 parts by mass with respect to 100 parts by mass of water, and a content of a structural unit having a primary hydroxyl group in the side chain contained in the polyvinyl alcohol resin is 0.1 mol % to 20 mol %.

* * * * *